June 16, 1959 H. W. HAMMOND 2,890,458
EYESHIELD
Filed Feb. 15, 1957

INVENTOR.
HAROLD W. HAMMOND

McMorrow, Berman
and Davidson
ATTORNEYS

_____

2,890,458

EYESHIELD

Harold W. Hammond, Brookline, Mass.

Application February 15, 1957, Serial No. 640,388

5 Claims. (Cl. 2—13)

_____

The present invention relates to an eyeshield for attachment to a pair of spectacles when worn by a wearer.

An object of the present invention is to provide an eyeshield which lends itself to ready use by a human wearing a pair of spectacles.

Another object of the present invention is to provide an eyeshield which may be easily folded for carrying in a pocket or purse.

A further object of the present invention is to provide an eyeshield which may be fabricated of a translucent material so as to filter out unwanted light rays, one which may be fabricated so as to be light in weight affording comfortable wear by a wearer, one which is sturdy in construction and simple in structure, and one which is economical to manufacture and assemble.

These and other objects and advantages of the present invention will become fully apparent from the following description when taken in connection with the annexed drawing, in which.

Figure 1:
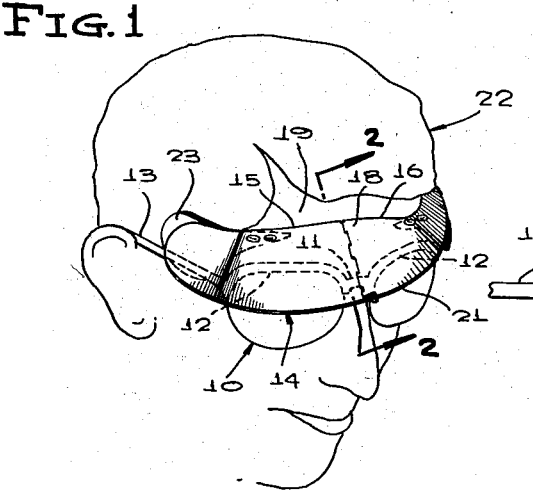
Figure 1 is a perspective view of the head of a human with the eyeshield according to the present invention in a position of use.
Figure 2:
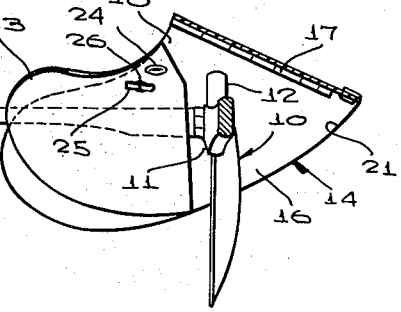
Figure 2 is a sectional view, on an enlarged scale, taken on line 2—2 of Figure 1.
Figure 3:
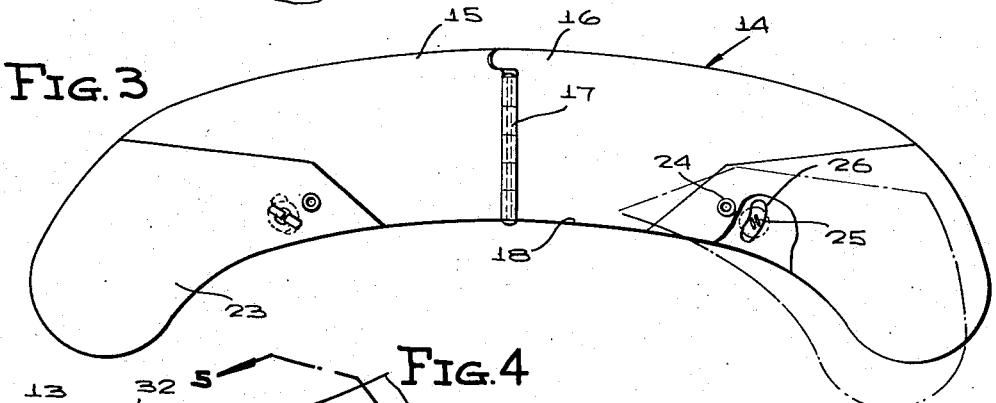
Figure 3 is a plan view of the eyeshield according to the present invention, the dotted line showing indicating the movement of one of the tabs.

Referring in greater detail to the drawing in which like numerals indicate like parts throughout the several views, the present invention is for use with spectacles designated generally by the reference numeral 10 and including a nose piece 11 and a pair of eyeglass frames 12, one on each side of the nose piece 11. A pair of temple pieces 13 are provided on the spectacles 10 and connected to the sides of the frames 12 remote from the nose piece 11.

The eyeshield according to the present invention comprises an elongated strip 14, formed in two sections 15 and 16 arranged in confronting aligned relationship and hingedly connected together along the confronting portions, the hinge being indicated by the reference numeral 17.

One side edge 18 of the eyeshield strip 14 is conformably shaped to fit and to extend about and engage a portion of the forehead of a human 19 above and adjacent the eyes thereof with the portion of the eyeshield strip 14 between the side edge 18 and the opposite side edge 21 extending over and above the nose piece 11 and eyeglass frames 12 and sloping downwardly when in a position of use, as shown in Figure 1, the head of the human being indicated generally by the reference numeral 22.

A tab 23 fabricated of flexible sheet material has one face which abuts and extends along the underface of the strip 14 adjacent the free end of each section 15 and 16. Each tab 23 extends from the free end of the section 15 or 16 to a point inwardly of and spaced from the free end of such section 15 or 16, and is of a shape similar to the adjacent end portions of the section 15 or 16.

Means is provided connecting the portion of each of the tabs 23 remote from the free end of the adjacent section 15 or 16 to the adjacent portion of the strip 14 for swinging movement from the abutting position to a position outwardly of and away from the strip 14 and for pivotal movement from the position extending along the undersurface of the strip 14 to a position projecting outwardly from the side edge 18 of the strip 14. Specifically, this means consists in a loose rivet 24 and a second loose rivet 25, the rivet 24 extending between and connecting the tab 23 to the adjacent portion of the strip 14 for pivotal movement about the rivet 24 as an axis. The rivet 25 extends through a hole in the strip 14 and through an elongated arcuately curved slot 26 in the tab 23.

In use, the eyeshield according to the present invention is worn upon the head 22 of a human with the tabs 23 engaging the inner surface of the adjacent temple piece 13 and with the strip 14 extending over the frames 12 and nose piece 11, as shown in Figure 1.

In a modified form of the present invention, the eyeshield is formed by a flexible strip 27 having two sections 28 and 29 the sections 28 and 29 of the strip 27 are connected by a hinge 31 for movement from the confronting aligned relation position to a position in which the sections 28 and 29 are in face-to-face relation.

Figure 4:
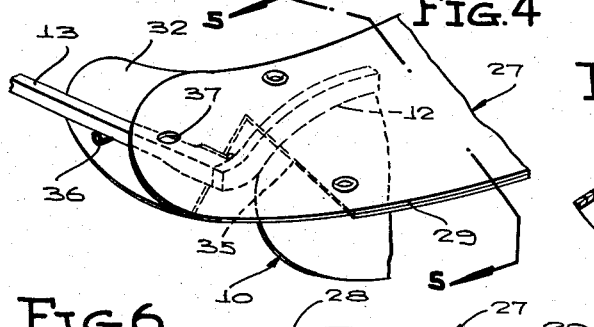
Figure 4 is a fragmentary perspective view of a modified form of the eyeshield according to the present invention.
Figure 5:
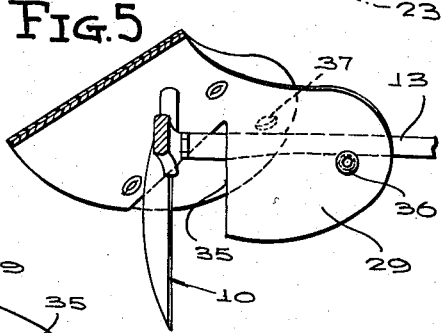
Figure 5 is a sectional view, taken on the line 5—5 of Figure 4.
Figure 6:
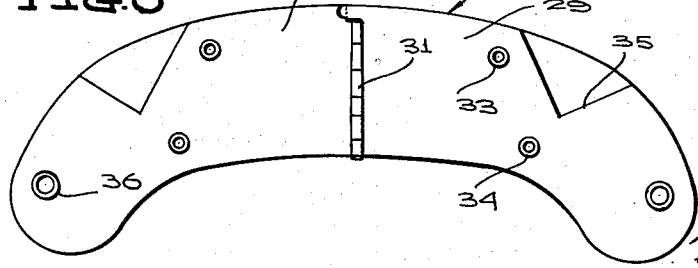
Figure 6 is a plan view of the undersurface of the modified form of the invention shown in Figures 4 and 5.

In the modified form of the eyeshield, shown in Figures 4 to 6, inclusive, the strip 27 is in two thicknesses with the free ends of the sections 28 and 29 movable away from and toward each other from the abutting position to a position outwardly from each other, such free end sections constituting on one face a freely movable tab 32. Rivets 33 and 34 secure the two pieces together to form the tab 32 and a notch 35 is cut inwardly from one side edge of the strip 27 to receive therebetween the temple piece 13 of the spectacle 10 when in a position of use as shown in Figures 4 and 5.

Abutment means is provided for each of the tabs 32 for releasably engaging the underedge of the adjacent temple piece 13 when the strip 27 is in a position of use. Specifically, this abutment means consists in a rivet 36 projecting inwardly from each of the tabs 32 and being of such length as to engage the under edge of the temple piece 13, as shown in Figure 4. The hole 37 is provided in the other portion of the strirp 27 for receiving the free end of the rivet 36 when the sections 28 and 29 are folded about the hinge 31 to the abutting face-to-face relationship position in which position the eyeshield according to the present invention is of compact size readily insertible and withdrawable from a pocket or purse.

In each of the forms of the invention here illustrated and described, the strips 14 or 27 may be fabricated of hard cardboard, flexible plastic, light weight metal or other material as desired. If of plastic, the strips 14 and 27 may be of colored plastic translucent and light-transmitting in such amounts as is found desirable. The eyeshield according to the present invention may be readily attached and detached from the spectacles 10 and when worn on the head of an individual is of such construction as to afford complete comfort and to protect the eyes of the individual against unwanted glare of natural sunlight or artificial lights.

What is claimed is:

1. The combination with spectacles including a nose piece, an eyeglass frame on each side of said nose piece, and a temple piece connected to each of the sides of said eyeglass frame remote from said nose piece, of an eyeshield comprising an elongated strip of flexible sheet material having one side edge adapted to extend about and engage the portion of a forehead above and adjacent the eyes of a human with the portion between said one side edge and the other side edges of said strip extending over and above said nose piece and eyeglass frames and sloping downwardly when said strip is in the position of use by a wearer, a tab fabricated of flexible sheet material having one face abutting and extending along the underface of said strip adjacent each end of said strip, each of said tabs extending from one of the ends of said strip to a point inwardly of and spaced from said end and shaped similarly to the adjacent end portion of said strip, and means connecting each tab to the adjacent portion of said strip for swinging movement from the abutting position to a position outwardly of and away from said strip, each of said tabs when swung to the outwardly position having said one face abuttingly engaging the inner surface of the adjacent temple piece when said strip is in the aforesaid sloping position.

2. The combination with spectacles including a nose piece, an eyeglass frame on each side of said nose piece, and a temple piece connected to each of the sides of said eyeglass frames remote from said nose piece, of an eyeshield comprising an elongated strip of flexible sheet material having one side edge adapted to extend about and engage the portion of a forehead above and adjacent the eyes of a human with the portion between said one side edge and the other side edge of said strip extending over and above said nose piece and eyeglass frames and sloping downwardly when said strip is in the position of use by a wearer, said strip embodying a pair of sections arranged in confronting aligned relation and having the confronting portions connected together for movement from the aligned position to a position in which one of the sections abuts and extends along a face of the other of said sections, a tab fabricated of flexible sheet material having one face abutting and extending along the underface of said strip adjacent each end of said strip, each of said tabs extending from one of the ends of said strip to a point inwardly of and spaced from said end and shaped similarly to the adjacent end portion of said strip, and means connecting each tab to the adjacent portion of said strip for swinging movement from the abutting position to a position outwardly of and away from said strip, each of said tabs when swung to the outwardly position having said one face abuttingly engaging the inner surface of the adjacent temple piece when said strip is in the aforesaid sloping position.

3. The combination with spectacles including a nose piece, an eyeglass frame on each side of said nose piece, and a temple piece connected to each of the sides of said eyeglass frames remote from said nose piece, of an eyeshield comprising an elongated strip of flexible sheet material having one side edge adapted to extend about and engage the portion of a forehead above and adjacent the eyes of a human with the portion between said one side edge and the other side edge of said strip extending over and above said nose piece and eyeglass frames and sloping downwardly when said strip is in the position of use by a wearer, a tab fabricated of flexible sheet material having one face abutting and extending along the underface of said strip and having a portion adjacent each end of said strip, each of said tab portions being shaped similarly to the adjacent end portions of said strip, means connecting the portion of each tab remote from the adjacent strip end to the adjacent portion of said strip for swinging movement from the abutting position to a position outwardly of and away from said strip, each of said tabs when swung to the outwardly position having said one face abuttingly engaging the inner surface of the adjacent temple piece when said strip is in the aforesaid sloping position.

4. The combination with spectacles including a nose piece, an eyeglass frame on each side of said nose piece, and a temple piece connected to each of the sides of said eyeglass frames remote from said nose piece, of an eyeshield comprising an elongated strip of flexible sheet material having one side edge adapted to extend about and engage the portion of a forehead above and adjacent the eyes of a human with the portion between said one side edge and the other side edge of said strip extending over and above said nose piece and eyeglass frames and sloping downwardly when said strip is in the position of use by a wearer, a tab fabricated of flexible sheet material having one face abutting and extending along the underface of said strip and having a portion adjacent each end of said strip, each of said tab portions being shaped similarly to the adjacent end portions of said strip, means connecting each tab to the adjacent portion of said strip for swinging movement from the abutting position to a position outwardly of and away from said strip and for pivotal movement from the position extending along the undersurface of said strip to a position projecting outwardly from said one side edge of said strip, each of said tabs when swung to the outwardly position having said one face abuttingly engaging the inner surface of the adjacent temple piece when said strip is in the aforesaid sloping position.

5. The combination with spectacles including a nose piece, an eyeglass frame on each side of said nose piece, and a temple piece connected to each of the sides of said eyeglass frames remote from said nose piece, of an eyeshield comprising an elongated strip of flexible sheet material having one side edge adapted to extend about and engage the portion of a forehead above and adjacent the eyes of a human with the portion between said one side edge and the other side edge of said strip extending over and above said nose piece and eyeglass frames and sloping downwardly when said strip is in the position of use by a wearer, a tab fabricated of flexible sheet material having one face abutting and extending along the underface of said strip and having a portion adjacent each end of said strip, each of said tab portions being shaped similarly to the adjacent end portions of said strip, means connecting the portion of each tab remote from the adjacent strip end to the adjacent portion of said strip for swinging movement from the abutting position to a position outwardly and away from said strip, each of said tabs when swung to the outwardly position said one face abuttingly engaging the inner surface of the adjacent temple piece when said strip is in the aforesaid sloping position, and abutment means carried by each of said tabs releasably engageable with the adjacent temple piece when said strip is in the aforesaid position for holding said tab in engagement with said temple piece inner surface.

References Cited in the file of this patent

UNITED STATES PATENTS

| 779,340 | Wynkoop | Jan. 3, 1905 |
| 2,106,615 | Maurer | Jan. 25, 1938 |

FOREIGN PATENTS

| 16,045 | Great Britain | of 1892 |
| 398,881 | Great Britain | Sept. 25, 1933 |